United States Patent [19]

Jeffers

[11] Patent Number: 5,218,493

[45] Date of Patent: Jun. 8, 1993

[54] MAGNETIC RECORDING APPARATUS INCLUDING A MAGNETIC HEAD HAVING A CURVED MEDIA-CONTACT SURFACE EQUAL TO THE CURVATURE OF A ROTATABLE DRUM

[75] Inventor: Frederick J. Jeffers, Escondido, Calif.

[73] Assignee: Eastman Kodak Company, Rochester, N.Y.

[21] Appl. No.: 685,342

[22] Filed: Apr. 15, 1991

[51] Int. Cl.⁵ ............ G11B 5/004; G11B 19/00; G11B 5/265
[52] U.S. Cl. ................ 360/100.1; 360/107; 360/121
[58] Field of Search .................. 360/16–17, 360/100.1, 107, 121–122

[56] References Cited

U.S. PATENT DOCUMENTS

| | | | |
|---|---|---|---|
| 3,699,269 | 10/1972 | Smaller | 360/16 |
| 3,869,711 | 3/1975 | Bernard | 360/17 |
| 4,110,797 | 8/1978 | Hoshino | 360/17 |
| 4,567,535 | 1/1986 | Kinjo | 360/100.1 |

*Primary Examiner*—A. J. Heinz
*Attorney, Agent, or Firm*—William W. Holloway

[57] ABSTRACT

Apparatus, for duplicating magnetically recorded information by contact transfer from a master medium in the form of a magnetic rotatable drum to a slave medium in the form of a magnetic tape, includes a magnetic head, for initially recording the information to be duplicated on the magnetic drum, having a media-contact surface the curvature of which conforms to the curvature of the drum. The magnetic head is mounted with its media-contact surface essentially parallel with the surface of revolution of the drum, thereby enhancing signal-to-noise performance by suppressing spacing losses.

9 Claims, 3 Drawing Sheets

MAGNETIC RECORDING APPARATUS INCLUDING A MAGNETIC HEAD HAVING A CURVED MEDIA-CONTACT SURFACE EQUAL TO THE CURVATURE OF A ROTATABLE DRUM

CROSS-REFERENCE TO A RELATED APPLICATION

Reference is hereby made to U.S. Pat. application Ser. No. 652,972 entitled CONTACT DUPLICATION OF MAGNETICALLY RECORDED INFORMATION WITHOUT THE USE OF A TRANSFER FIELD, filed in the names of F. Jeffers et al on Feb. 11, 1991.

BACKGROUND OF THE INVENTION

1. Field of the Invention

This invention relates generally to the duplication of magnetically recorded information. More specifically, the invention relates to a magnetic head for inductively recording on a master medium, or playing back information from a slave medium, in the form of a rotatable drum.

2. Description Relative to the Prior Art

The duplication of magnetically recorded information can be accomplished by simply feeding an electrical playback signal from a master recorder to multiple slave recorders connected in parallel, where the information is duplicated in real time by each of the slave recorders.

Duplication of magnetically recorded information can also be accomplished by a contact printing method, using either an anhysteretic, hysteretic or a thermal technique. In this method, a master medium, having information recorded thereon, is placed in contact with a slave medium under conditions that promote efficient transfer of recorded information without causing demagnetization of the master medium. For example, contact transfer is usually performed by transferring magnetic information from a high coercivity master medium to a lower coercivity slave medium while the master and slave media are held in non-slipping engagement with each other.

Among other things, contact transfer offers an apparent advantage over "real time" duplication in that the recording of information on the slave medium is accomplished without the slave medium coming into frictional contact with a magnetic record head. This, of course, obviates wear and tear of both the slave medium and magnetic head. This is particularly important in a situation involving the recording of short wavelength signals wherein it otherwise would be imperative that intimate contact be maintained at a media-to-head interface to minimize spacing losses.

Contact transfer offers a further advantage when repetitive information is to be duplicated. This is because the master magnetic medium can be in the form of a compact roller or rotatable drum, with the information to be duplicated recorded on a magnetizable material on the circumferential surface of the drum. In this situation, the drum is rotated with its peripheral speed equal to the translational speed of a slave magnetic tape which is held in contact with the circumferential surface of the drum. Information magnetically recorded on the circumferential surface of the drum is transferred repetitively to the slave tape at a rate corresponding to the rotational speed of the roller. U.S. Pat. No. 3,277,244 discloses a system in which magnetically recorded information is transferred between a magnetic tape and a rotatable drum, by means of an anhysteretic contact printing method.

Whether the drum (or roller) functions as the master medium or as the slave, a magnetic head commonly serves as the means by which information is either initially inductively recorded on or is initially inductively played back from the drum. In either case, the transducing gap of the head should be placed in intimate contact with the cylindrical surface of the drum to enhance the signal-to-noise ratio of the signal recorded on, or played back from, the drum. When there is intimate contact between the drum and head, however, a magnetic head having a media-contact surface of conventional design is susceptible to an angular displacement in its position, under the influence of rotational movement of the drum. Even though the head and the rotational surface of the drum may remain in physical contact, a small rotation of the head would move its transducing gap away from the surface of revolution of the drum, and thereby dramatically reduce recording/playback performance.

SUMMARY OF THE INVENTION

In view of the foregoing, it is an object of the present invention to enhance signal-to-noise performance when inductively magnetically recording a signal on, or inductively playing back a signal from, a rotatable drum.

This object is achieved by means of a magnetic head having a gapped media-contact surface the curvature of which is equal to the curvature of a circumferential surface of the drum. Further, the magnetic head is mounted with its media-contact surface immediately adjacent to and essentially parallel with the surface of revolution of the drum.

In a presently preferred embodiment, the media-contact surface of the magnetic head is of concave shape with the head mounted external to the surface of revolution of the drum. In an alternative embodiment, the media-contact surface of the magnetic head is of convex shape with the head mounted inside the drum, between its axis of rotation and its surface of revolution. In either case, the head is positioned in abutting engagement with the circumferential surface of the drum, essentially in parallel relationships therewith.

With the curvature of a media-contact surface of a magnetic head equal to the curvature of the circumferential surface of a rotatable drum and with the media-contact surface in abutting engagement with the circumferential surface, the magnetic head is secured against rotational movement. Thus, the magnetic head is prevented from pivoting under the influence of rotational movement of the drum or other disturbing forces. This is particularly important in the case of a multitrack head where it will be appreciated that pivoting of the head will cock the head gaps relative to the direction of motion of the drum surface, shifting the relative positions of the data recorded on the drum. Intimate contact between the circumferential surface of the drum and the curved surface of the magnetic head can be maintained, thereby suppressing recording/playback spacing losses, simply by securing the magnetic head against translational movement orthogonal to the circumferential surface of the roller.

This advantage, as well as other advantages of the invention, will become more apparent in the detailed description of a preferred embodiment presented below.

BRIEF DESCRIPTION OF THE DRAWINGS

The invention will be described with reference to the accompanying drawings, of which.

DETAILED DESCRIPTION OF THE PREFERRED EMBODIMENT

Figure 1:
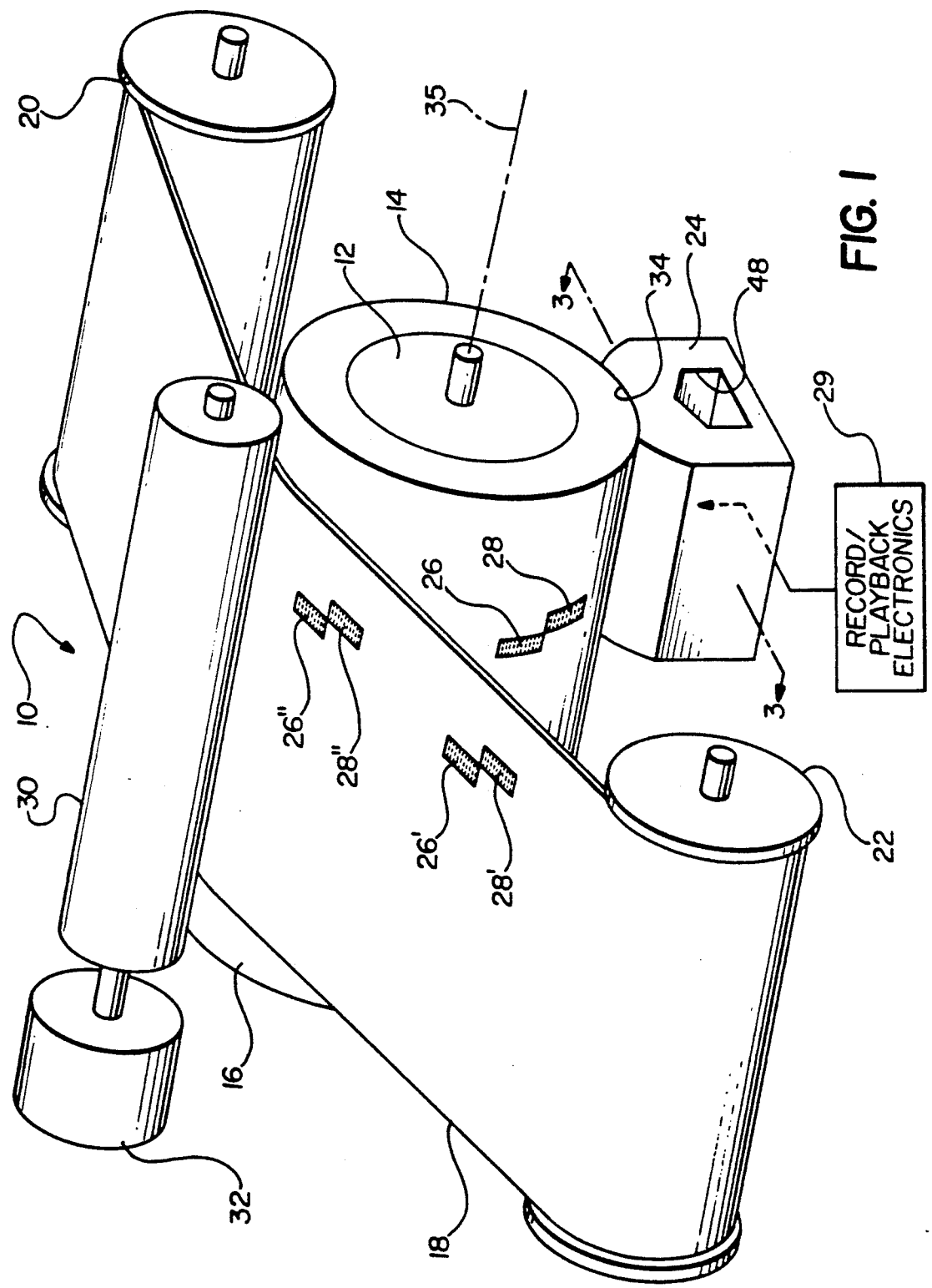
FIG. 1 is a perspective view of magnetic duplicating apparatus in accordance with a presently preferred embodiment of the invention.

FIG. 1 shows apparatus 10 for duplicating magnetically recorded information by contact transfer from a master medium to a slave medium. In the embodiment of FIG. 1, contact printing occurs in the absence of a magnetic transfer field (the hysteretic technique).

The master medium is in the form of a rigid drum or roller 12 having a layer 14 of magnetizable material coated on its outer cylindrical surface 16. The slave medium, or the other hand, is in the form of an elongate strip of flexible magnetic tape 18 which extends from a supply reel 20 to a take-up reel 22.

A magnetic head 24, described in detail hereinbelow, serves to initially inductively record signals 26 and 28 on the layer 14 of magnetizable material. For that purpose, record/playback electronic circuitry 29 applies appropriate drive signals to a coil winding of the magnetic head 24.

A capstan 30, under the control of a capstan motor 32, functions to drive both the drum 12 and the slave tape 18 at a controlled rate of speed. In doing so, the capstan 30 pinches the tape 18 against the cylindrical surface 16 of the drum 12 to, in effect, transport the slave tape through a contact-transfer zone in intimate, non-slipping contact with the drum. As the tape 18 is transported through the contact-transfer zone, the signals 26 and 28 effect a corresponding magnetization (denoted 26' and 28') of the slave tape that is a mirror image of the magnetization pattern, i.e. signals 26 and 28, initially recorded on the cylindrical surface 16 of the drum 12. With this arrangement, the signals 26, 28 are repetitively duplicated on the tape 18, as shown by the numerals 26', 28' and 26'', 28'', at a rate corresponding to the circumferential speed of the drum 12. Drum-type apparatus for contact duplication of magnetically recorded information is the subject of the aforecited U.S. Pat. application Ser. No. 652,972, assigned to the assignee of this invention and the disclosure of which is incorporated herein by reference.

Although FIG. 1 shows isolated signals, such as servo data, recorded on the drum 12 and corresponding isolated signals duplicated on the tape 18 for the purpose of more clearly illustrating contact transfer from a master medium (in this case a drum) to a slave medium (tape), it will be understood by those skilled in the art, however, the signals being duplicated could just as well be continuous strips or tracks of information in which case such signals would be in the form of an enclosed circumferential loop on the drum 12.

An object of the invention is to enhance signal-to-noise performance when inductively recording a signal on a rotatable drum. To that end, the magnetic head 24 has a media-contact surface 34 the curvature of which is equal to the curvature of the circumferential surface of the drum 12. With the same curvature, the media-contact surface 34 can be positioned in intimate contact with the cylindrical surface of the drum 12, essentially in parallel relationship therewith. In the embodiment of FIG. 1, the magnetic head 24 is mounted outside the drum 12, with the media-contact surface 34 facing the rotational axis 35 of the drum. With this arrangement, the media-contact surface 34 is of concave shape.

Figure 2:
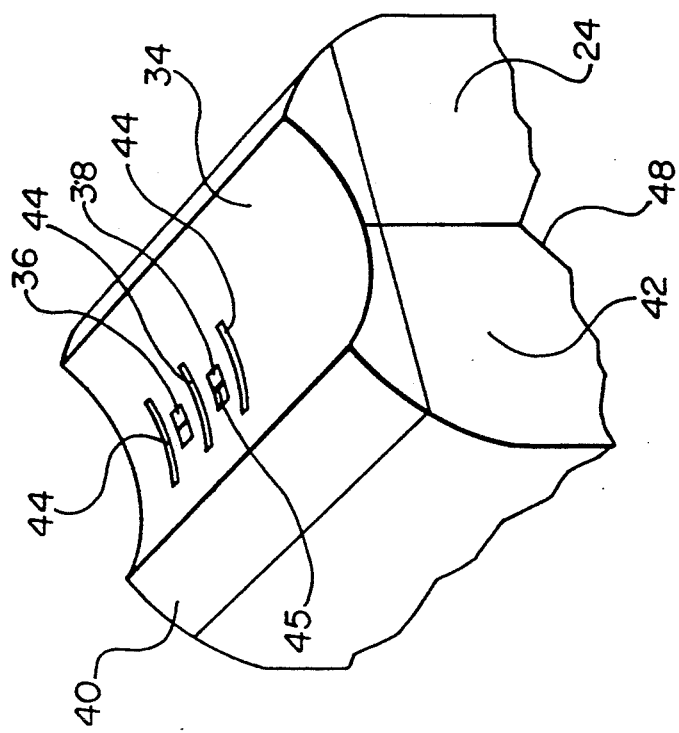
FIG. 2 is a perspective view of a concave media-contact surface of a magnetic head in accordance with the invention.

FIG. 2 is a perspective view showing the media-contact surface 34 of the magnetic head 24 of FIG. 1. In addition to its concave shape, the surface 34 includes two pairs of gapped pole tip pieces 36, 38 preferably bonded in grooves formed in a tip plate 40 covering a core 42 of magnetic material such as nickel zinc ferrite. The two pairs of gapped pole tip pieces 36, 38, which are made of an especially hard and durable material such as Sendust, are spaced axially from each other for the purpose of recording, respectively, the signals 26 and 28 on corresponding adjacent annular tracks on the drum 12. To that end, the tip plate 40 is mounted to a frame (not shown) of the head 24 to provide intimate contact between each tip piece 36, 38 and the underlying core 42 of magnetic material. Furthermore, the tip plate 40 is slotted to accommodate intertrack shields 44 which serve to suppress cross talk between signals recorded on adjacent tracks. After assembly of the tip pieces 36, 38, tip plate 40, core 42 and shields 44, the surface 34 is contoured to a desired concave configuration, preferably by surface lapping.

Figure 3:
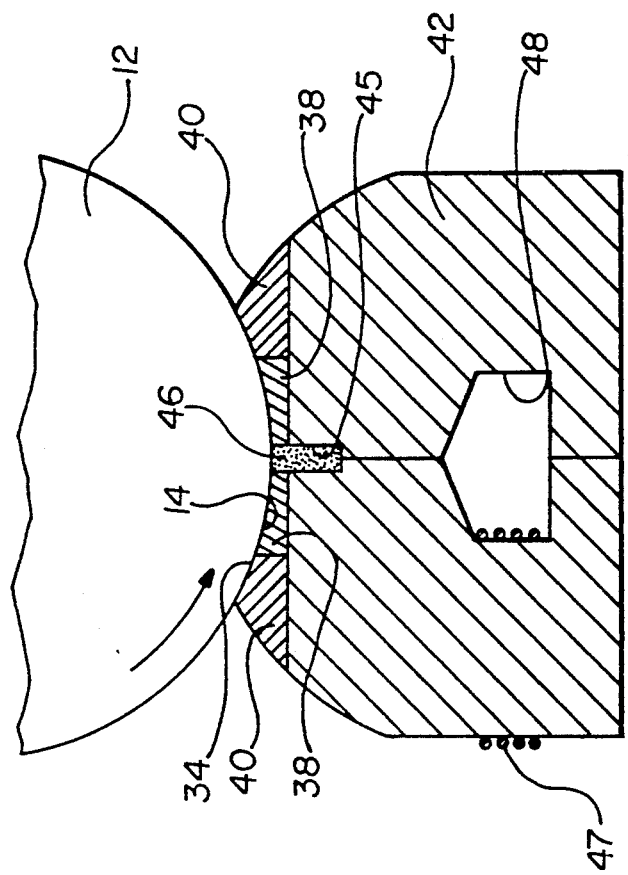
FIG. 3 is a cross-sectional view of the magnetic head of FIG. 1 taken along the lines 3–3 thereof.

FIG. 3 is a cross-sectional view of the magnetic head 24 along the lines 3—3 (FIG. 1), which extend through the pole tip pieces 38. As shown, the corresponding pair of pole tip pieces 38 are separated by a transducing gap 45 (also shown in FIG. 2) which extends to the media contact surface 34. The gap 45 is filled with a glass 46 which serves to retard wear and tear at the gap edges due to relative frictional movement between the drum 12 and the magnetic head 24. FIG. 3 also shows the core 42 wrapped by a coil 47 comprising a number of turns of thin wire extending through a coil window 48.

Figure 4:
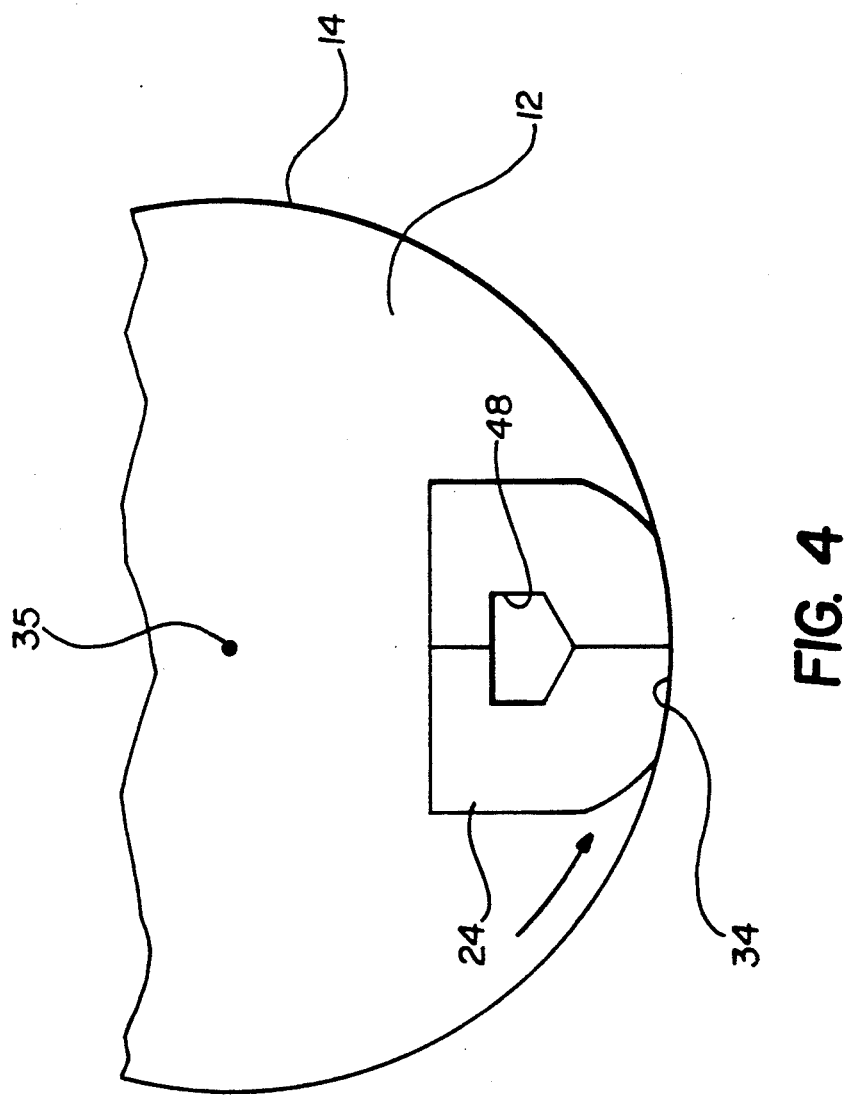
FIG. 4 is a partial side elevation view of magnetic duplicating apparatus in accordance with an alternative preferred embodiment.

FIG. 4 is a side elevation view of an alternative preferred embodiment of the present invention. In this embodiment, the magnetic head 24 is disposed inside the drum 12, between its surface of revolution and rotational axis 35. The curvature of the media-contact surface 34 of the magnetic head 24 again conforms to or is equal to the curvature of the circumferential surface of the drum 12. In this case, however, the surface 34 is of convex shape so that the media-contact surface 34 of the head can be positioned in parallel relationship with the inside surface of the drum. Furthermore, the layer 14 of magnetizable material is preferably coated on the inside of the cylindrical surface 16 of the drum 12, to suppress spacing losses.

In either the embodiment of FIGS. 1-3 or the alternative embodiment of FIG. 4, as long as the media-contact surface 34 is held against the curved cylindrical surface of the drum 12, the magnetic head 24 locates itself automatically in a proper angular position. In other words, whenever there is contact between the two curved surfaces and the magnetic head 24 is secured against translational movement orthogonal to the curved surface of the drum 12, the transducing gap 45 of the media-contact-surface 34 can be maintained in optimum intimate contact with the curved magnetizable surface of the roller 12, thereby enhancing signal-to-noise performance by reducing spacing losses.

There are a variety of relatively simple mechanisms known in the art that are suitable for holding the magnetic head 24 securely in proper position relative to the drum 12. For example, spring means or the like can be utilized for resiliently biasing the magnetic head 24 so that its curved media-contact surface 34 is held securely against the cylindrical surface of the drum 12.

The invention has been described in detail with particular reference to a presently preferred embodiment, but it will be understood that variations and modifications can be effected within the spirit and scope of the invention.

What is claimed is:

1. Magnetic recording/playback apparatus of the type comprising:
   a) a rotatable drum of fixed radius having a layer of magnetic material on its circumferential surface; and
   b) a multitrack magnetic head having a plurality of magnetic gaps, said head having a curved media-contact surface containing said gaps, said curved surface having a curvature equal to the curvature of said circumferential surface of said drum, said magnetic head being mounted with said media-contact surface essentially parallel with said layer of magnetic material, wherein said plurality of magnetic gaps are disposed for multi-track magnetic recording/playback on said later.

2. Magnetic recording/playback apparatus of the type comprising:
   a) a rotatable drum having a fixed axis of rotation and having a layer of magnetic material on its surface of curvature; and
   b) a multi-track head having a curved media-contact surface the curvature of which is the same as the curvature of said drum, said magnetic head being mounted with its media-contact surface in contacting relationship with a circumferential section of said drum.

3. Magnetic recording/playback apparatus of the type comprising:
   a) a rotatable drum having a fixed axis of rotation and having a layer of magnetic material on its surface of curvature; and
   b) a multi-track magnetic head having a curved gapped media-contact surface the curvature of which conforms to the circumferential surface of said drum, said magnetic head being mounted with its gapped media-contact surface in abutting engagement with a circumferential section of said drum.

4. Magnetic recording/playback apparatus of the type comprising:
   a) a drum rotatable about an axis and having a layer of magnetic material on its outside circumferential surface; and
   b) a multi-track magnetic head having a plurality of magnetic gaps, said head having a media-contact surface of concave shape containing said gaps said surface having a curvature equal to the curvature of said outside circumferential surface of said rotatable drum, said magnetic head being mounted with said concave media-contact surface essentially parallel with the outside circumferential surface of said drum, wherein said plurality of magnetic gaps are disposed for magnetic multi-track recording/playback on said layer.

5. Magnetic recording/playback apparatus of the type comprising:
   a) a drum rotatable about a fixed axis and having a layer of magnetic material on its outside surface of curvature; and
   b) a multi-track magnetic head having a concave media-contact surface the curvature of which is the same as the outside curvature of said drum, said magnetic head being mounted with its concave media-contact surface in contacting relationship with an outside circumferential section of said drum.

6. Magnetic recording/playback apparatus of the type comprising:
   a) a drum of fixed radius having a layer of magnetic material on its surface of curvature; and
   b) a multi-track magnetic head having a concave gapped media-contact face the curvature of which conforms to the outside circumferential surface of said drum, said magnetic head being mounted with its gapped media-contact face in abutting engagement with an outside circumferential section of said drum.

7. Magnetic recording/playback apparatus of the type comprising:
   a) a drum rotatable about an axis and having a layer of magnetic material on its inner circumferential surface; and
   b) a multi-track head having a plurality of magnetic gaps, said head having a media-contact surface of convex shape containing said gaps, said media-contact surface having a curvature equal to the curvature of said circumferential surface of said drum, said magnetic head being mounted between said axis of rotation of said drum and its inner circumferential surface with its convex media-contact surface essentially parallel with said inner circumferential surface of said drum, wherein said plurality of magnetic gaps are disposed for multi-track magnetic recording/playback on said layer.

8. Magnetic recording/playback apparatus of the type comprising:
   a) a drum of fixed radius rotatable about an axis and having a layer of magnetic material on its surface of curvature; and
   b) a multi-track magnetic head having a convex media-contact surface the curvature of which is the same as the curvature of said drum, said magnetic head being mounted between the axis of rotation of said drum with its convex media-contact surface in contacting relationship with a circumferential section of said drum.

9. Magnetic recording/playback apparatus of the type comprising:
   a) a drum rotatable about a fixed axis and having a layer of magnetic material on its surface of curvature; and
   b) a multi-track magnetic head having a convex gapped media-contact face the curvature of which conforms to the curvature of the inside circumferential surface of said drum, said magnetic head being mounted between the axis of rotation of said drum and its inside circumferential surface with its convex gapped media-contact face in abutting engagement with an inside circumferential section of said drum.

* * * * *